(12) United States Patent
Beasley, Jr.

(10) Patent No.: US 6,632,753 B1
(45) Date of Patent: Oct. 14, 2003

(54) MOTOR VEHICLE AIR BAG AND FABRIC FOR USE IN SAME

(75) Inventor: Alonzo W. Beasley, Jr., Easley, SC (US)

(73) Assignee: Safety Components Fabric Technologies, Inc., Greenville, SC (US)

( * ) Notice: Subject to any disclaimer, the term of this patent is extended or adjusted under 35 U.S.C. 154(b) by 0 days.

(21) Appl. No.: 09/558,766

(22) Filed: Apr. 26, 2000

(51) Int. Cl.[7] .................................................. D03D 13/00
(52) U.S. Cl. ..................... 442/203; 139/408; 139/419; 139/420 R; 139/421; 139/423; 442/76; 442/104; 442/164; 442/168; 442/181; 442/182; 442/189; 442/206; 442/207; 442/208; 442/218; 442/286; 280/728.1
(58) Field of Search .................. 139/408–419, 139/420 R, 421–423; 442/76, 103, 104, 108, 168, 164, 181, 182, 183, 189, 203, 206, 207, 208, 218, 286; 280/728.1

(56) References Cited

U.S. PATENT DOCUMENTS

| | | |
|---|---|---|
| 3,892,425 A | 7/1975 | Sakairi et al. |
| 5,010,663 A | 4/1991 | Thornton et al. |
| 5,110,666 A | 5/1992 | Menzel et al. |
| 5,114,180 A | 5/1992 | Kami et al. |
| 5,131,434 A | 7/1992 | Krummheuer et al. |
| 5,213,363 A | 5/1993 | Fukumori et al. |
| 5,259,645 A | 11/1993 | Hirabayashi et al. |
| 5,277,966 A | 1/1994 | Nakayama et al. |
| 5,296,278 A | 3/1994 | Nishimura et al. |
| 5,302,432 A | 4/1994 | Shigeta et al. |
| 5,336,538 A | 8/1994 | Kitamura |
| 5,441,798 A | 8/1995 | Nishimura et al. |
| 5,566,434 A | 10/1996 | Beasley |
| 5,630,261 A | 5/1997 | Beasley, Jr. |
| 5,651,395 A | 7/1997 | Graham et al. |
| 5,671,935 A | 9/1997 | Berger et al. |
| 5,685,347 A | 11/1997 | Graham et al. |
| 5,707,711 A | 1/1998 | Kitamura |
| 5,775,729 A | 7/1998 | Schneider et al. |
| 5,788,270 A | 8/1998 | Haland et al. |
| 5,865,464 A | 2/1999 | Kanuma et al. |
| 5,881,776 A | 3/1999 | Beasley, Jr. |
| 5,901,979 A | 5/1999 | Schneider et al. |
| 6,455,449 B1 * | 9/2002 | Veiga et al. ............. 280/728.1 |

FOREIGN PATENT DOCUMENTS

GB    2241207    8/1991

* cited by examiner

Primary Examiner—Arti R. Singh
(74) Attorney, Agent, or Firm—Nelson Mullins Riley & Scarborough

(57) ABSTRACT

An air bag of the type utilized in a vehicle occupant restraint system has at least one panel of coated air bag fabric comprising a base fabric coated with a urethane coating material. The base fabric is woven in warp and fill directions from synthetic multifilament yarns. In at least one of the weave directions, the yarns comprise first yarns of a first yarn size and second yarns of a second yarn size, with the second yarn size being a lesser yarn size than the first yarn size. The first yarns and the second yarns are in predetermined positions in the base fabric to produce a crest and trough pattern on a surface thereof.

4 Claims, 5 Drawing Sheets

MOTOR VEHICLE AIR BAG AND FABRIC FOR USE IN SAME

BACKGROUND OF THE INVENTION

The present invention relates generally to air bags of the type utilized in vehicle occupant restraint systems.

Motor vehicles in service today are commonly equipped with air bag systems to supplement the protection provided by seatbelts. These air bag systems utilize at least one folded air bag in fluid communication with a source of inflation gas. A sensor is provided to detect a collision between the vehicle and another object. When such a collision is detected, the sensor actuates the source of inflation gas. As a result, the air bag is rapidly expanded to absorb at least a portion of the collision force that is would otherwise have been imparted to the vehicle occupant.

Traditionally, a folded air bag is housed in the steering wheel and expanded when a collision is detected so as to protect the driver. A second air bag has been housed in the dash to protect an occupant located in the front passenger seat. In either case, it is important to design the air bag such that it will quickly deflate after it is inflated by the inflation gas. As a. result, the air bag will collapse in a controlled manner as it is impacted by the vehicle occupant. Adequate support will thereby be provided to the vehicle occupant without excessive rebounding.

Due to various considerations, driver side air bags and passenger side air bags have often been constructed of different materials. For example, passenger side air bags have often been constructed of uncoated fabric. Driver side air bags, in contrast, have frequently been constructed of a base fabric woven from either nylon or polyester yarns, which have been coated with an appropriate elastomeric material to reduce permeability. Both passenger side and driver side air bags are often equipped with relatively large vent holes through which the inflation gas is expelled.

In addition to driver side and passenger side air bags, many vehicles are now being equipped with side cushions (or "side bags"), side curtains, or both. Side cushions are typically mounted in the outboard side of the seat, whereas side curtains are typically mounted along the roof rail of the vehicle. The side cushions are useful in protecting the middle and lower abdomen region of the occupant's body. Side curtains shield against breaking window glass and offer a degree of protection to the occupant's head.

In contrast to driver side and passenger side air bags, both side cushions and side curtains must remain inflated for relatively lengthy periods of time for continuous protection of the vehicle occupant. This is because the side of the vehicle is vulnerable upon impact to penetration of another vehicle or object. Thus, it is not unusual for vehicle manufacturers to require devices designed for side impact protection to remain inflated for several seconds.

The art has provided three primary techniques for the production of side curtains. The first such technique is to produce a one-piece side curtain using a jacquard loom. The one-piece curtain is coated with a suitable silicone or urethane to increase its air holding capability. A layer of nonwoven material is provided on the outside of the curtain nearest the door window to inhibit glass penetration. While these cushions have worked well for their intended purpose, jacquard looms are generally much more expensive than standard flat weaving equipment. In addition, it is relatively difficult to coat a one-piece curtain.

Second, the art has provided side curtains made from flat fabrics that have been coated with silicone. Pieces of the coated fabric are sewn together to yield a bag of the desired shape. One drawback of this approach is that the seams must generally be treated with a silicone spray or adhesive to plug the sew holes.

A third technique involves the production of side curtains using flat fabric coated with urethane. One advantage of urethane-coated fabric is that it can be welded to itself using RF technology or heat, thus eliminating the need to sew pieces of the coated fabric together. While a relatively thick coating of urethane is necessary in order to produce good welding, urethane-coated fabric is generally less costly than the use of a silicone-coated coated fabric which must be sewn.

It is desirable for the base fabric of a urethane-coated material to be made from a finer denier yarn in order to meet packaging requirements. This is because a urethane-coated material in which the base fabric is made from yarn of 630 denier (630d) or higher will often be too bulky for folding and packaging in the vehicle's roof rail. As such, fabrics made from yarns of smaller denier (such as 525d, 420d, 315d or 210d) are considered more desirable for side curtain applications.

One significant problem, however, has been noted with the use of base fabrics made from finer denier yarns. Specifically, the welded strength of the seam can exceed the strength of adhesion of the coating to the fabric. As such, the urethane coating may have a tendency to peel away from the base fabric. Better adhesion can be achieved with a looser weave, but a looser weave may adversely affect the strength characteristics of the resulting material. In addition, the urethane may simply bleed through the interstices of a loosely woven material during the coating process. Furthermore, even if successfully applied, the urethane coating may have a greater tendency to crack open if the base material is loosely woven.

SUMMARY OF THE INVENTION

The present invention recognizes and addresses the foregoing disadvantages, and others, of prior art constructions and methods.

Accordingly, it is an object of the present invention to provide an improved air bag for use in a motor vehicle.

It is a particular object of the present invention to provide an improved vehicle air bag for use in a side impact protection system.

It is a more particular object of the present invention to provide a side curtain made from an improved urethane-coated fabric.

It is also an object of the present invention to provide various novel fabrics, both coated and uncoated, for use in vehicle air bags.

Some of these objects are achieved by a vehicle air bag for use with an on-board inflator mechanism. The air bag has at least one panel of coated air bag fabric comprising a base fabric coated with an elastomeric coating material. The base fabric is woven in warp and fill (weft) directions from synthetic multifilament yarns. In at least one of the weave directions, the yarns comprise first yarns of a first yarn size and second yarns of a second yarn size, with the second yarn size being a lesser yarn size than the first yarn size. The first yarns and the second yarns are in predetermined positions in the base fabric to produce a crest and trough pattern on a surface thereof.

In some exemplary embodiments, the elastomeric coating material is a urethane coating material. In other embodiments, a silicone coating material may be utilized. The air bag itself may be configured as a side curtain air bag.

Often, the base fabric will be woven only from yarns having a size of no greater than 650 denier. The first yarns and the second yarns may be arranged at predetermined yarn positions in the fill direction of the base fabric, the warp direction of the base fabric, or both fill and warp directions of the base fabric. For example, the first yarns and second yarns may be located in alternating yarn positions in a particular weave direction.

In some exemplary embodiments, the first yarn size may be chosen from the group consisting of 525 denier, 420 denier and 315 denier. In such embodiments, the second yarn size will be a smaller yarn size chosen from the group consisting of 420 denier, 315 denier and 210 denier.

Embodiments of the present invention are contemplated comprising third yarns of a third yarn size located at predetermined positions in at least the fill direction of the base fabric. The third yarn size in such embodiments is a lesser yarn size than the second yarn size. If the first yarn size is 420 denier, for example, the second yarn size may be 315 denier and the third yarn size may be 210 denier. In such embodiments, at least the fill direction of the base fabric may be woven to have a repeated arrangement of first yarn-second yarn-third yarn-second yarn-first yarn.

Still further objects of the present invention are achieved by a coated fabric suitable for use in a vehicle air bag. The coated fabric comprises a base fabric made from synthetic multifilament yarns having a size no greater than 650 denier. The yarns are woven together in a plain weave pattern arranged in warp and fill directions. The yarns include first yarns of a first yarn size and second yarns of a second yarn size alternated in at least one of the weave directions. The second yarn size is a lesser yarn size than the first yarn size. The base fabric is coated with an elastomeric coating material.

Other objects of the present invention are achieved by a fabric suitable for use in a vehicle air bag. The fabric comprises a woven fabric made from synthetic multifilament yarns having a size no greater than 650 denier. The fabric is woven together in a plain weave pattern arranged in warp and fill directions. The yarns comprise first yarns of a first yarn size and second yarns of a second yarn size alternated in at least one of the warp and fill directions. The second yarn size is a lesser yarn size than the first yarn size. The base fabric may be coated with an elastomeric coating material, such as a urethane or a silicone coating material.

Additional objects of the present invention are achieved by a coated fabric suitable for use in a vehicle air bag. The coated fabric comprises a base fabric made from synthetic yarns each having at least 136 filaments to produce an aggregate size of 420 denier. The yarns are woven together in a twill weave pattern arranged in warp and fill directions so as to have a thread count of about 49×49. In this case, the base fabric is coated with a urethane coating material.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
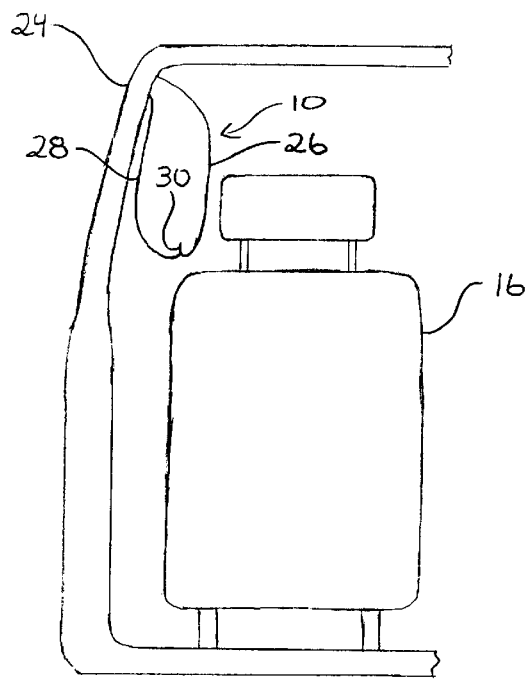
FIG. 1 is a diagrammatic representation of an inflated side curtain depending from the roof rail of a vehicle.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
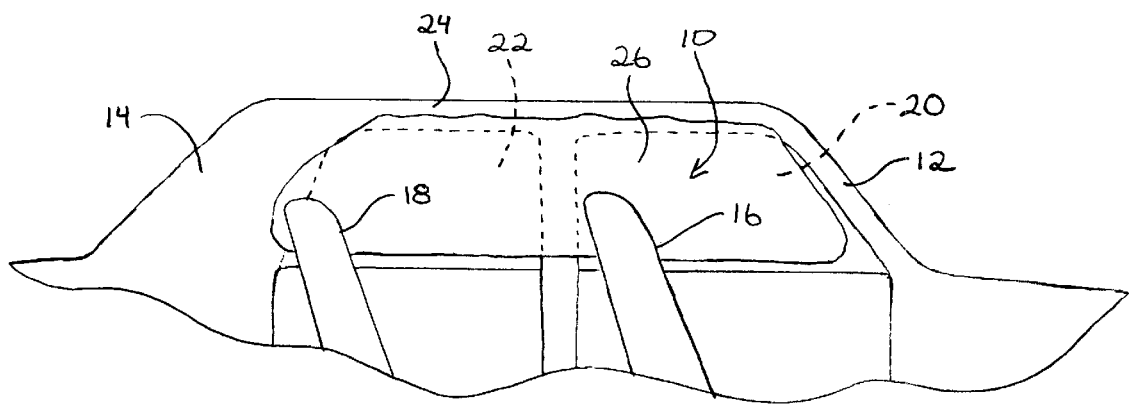
FIG. 2 is a side view from inside the vehicle of the inflated side curtain shown in FIG. 1.

FIGS. 1 and 2 illustrate an inflated side curtain 10 constructed in accordance with the present invention. In this case, side curtain 10 extends substantially the entire distance between front pillar 12 and rear pillar 14 on the vehicle's driver side. As such, side curtain 10 will serve to protect an occupant located in driver's seat 16 as well as a driver's side occupant located in the back seat 18 of the vehicle. Side curtain 10 is particularly useful in protecting the occupants' heads from impact against windows 20 and 22, as well as flying glass from same.

Before it is needed for protection of vehicle occupants, side curtain 10 is folded and stored in the vehicle's "roof rail" 24. Side curtain 10 is constructed of a first panel 26 and a second panel 28 attached along a seam 30. When an impact is detected, side curtain 10 is rapidly inflated by a source of inflation gas with which it is in fluid communication. Specific details regarding the operation of a side impact protection system can be found in U.S. Pat. No. 5,788,270, incorporated herein by reference.

Figure 3A:
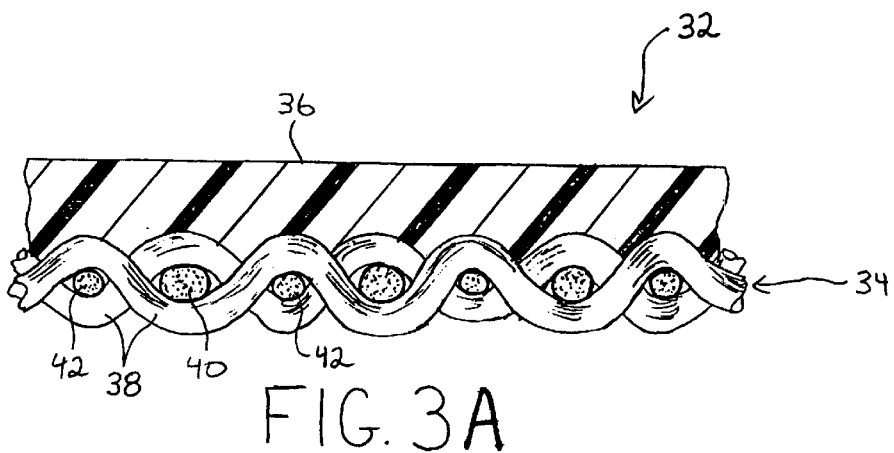
FIG. 3A is an enlarged cross-sectional side view of a urethane-coated fabric constructed in accordance with the present invention.

FIG. 3 illustrates a coated fabric 32 which may be used to produce the panels making up side curtain 10. In this case, coated fabric 32 comprises a woven base fabric 34 having a urethane coating 36 on one side which renders the composite structure practically impermeable to the passage of air. In this example, the other side of base fabric 34 remains uncoated. It should be understood, however, that embodiments are contemplated in which the other side is also coated, such as with a silicone coating material.

Figure 3B:
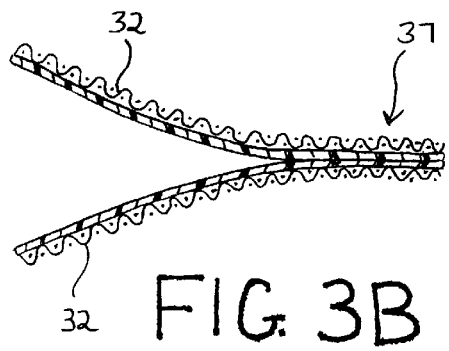
FIG. 3B is a diagrammatic representation of two panels of the urethane-coated fabric of FIG. 3A welded together along a seam.

The use of urethane as a coating material allows panels of the side curtain or other air bag to be connected to one another by welding. Welding eliminates the need to cover sew holes as is frequently required where a silicone coating is employed. This is illustrated in FIG. 3B, where two panels of fabric 32 are welded together (coated side to coated side) along a seam 37.

As discussed above, urethane coatings have often had a tendency to peel away from the base fabric when finer denier yarns have been employed. The present invention recognizes that the adhesion problem is due primarily to the construction of the base fabric. Specifically, the use of finer denier yarns produces a fabric surface that is too smooth for good adhesion when woven to the thread counts required in air bag applications. Larger denier yarns (e.g., greater than 650d) are also generally considered to be undesirable, however, since they produce a fabric which is difficult to package in small spaces.

The present invention provides base fabrics made from finer denier yarns which nevertheless provide an excellent bonding surface for a urethane coating. This is achieved by utilizing yarns of different sizes in either a single weave direction, or in both warp and fill directions. Base fabric 34 is an example of such a fabric.

Figure 4:
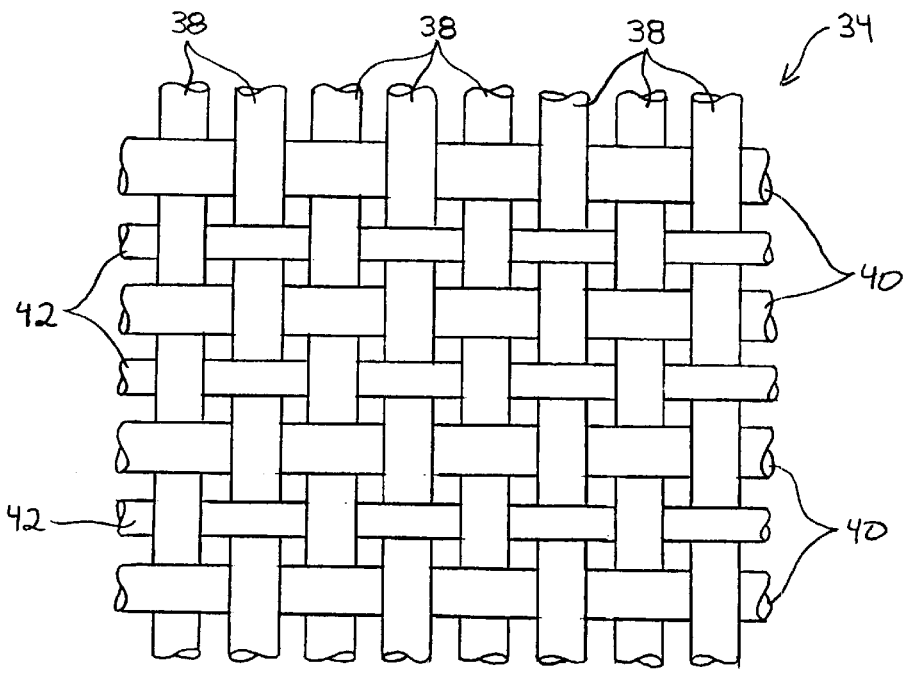
FIG. 4 is an enlarged plan view of the base fabric used in the coated fabric of FIG. 3A.

Referring now to FIG. 4, base fabric 34 is woven from a plurality of multifilament yarns made of an appropriate synthetic material, such as nylon or polyester. In this case, warp yarns 38 and first fill yarns 40 have a first yarn size. Every other fill position is occupied by a second fill yarn 42 of a second yarn size. Because the second yarn size is smaller than the first yarn size, a crest and trough pattern is produced on the surface of base fabric 34. This uneven surface allows the coating material to penetrate, thus facilitating adhesion of the coating material.

Preferably, all of the yarns utilized in base fabric 34 will have a size no greater than 650d. Mixed yarns of smaller sizes are even more preferred in order to enhance the foldability of the resulting fabric. For example, base fabric 34 may be made from combinations of yarns selected from the standard sizes of 525d, 420d, 315d and 210d. The resulting fabric would be used in lieu of prior art air bag fabrics made from yarns of a single yarn size.

Figure 5:
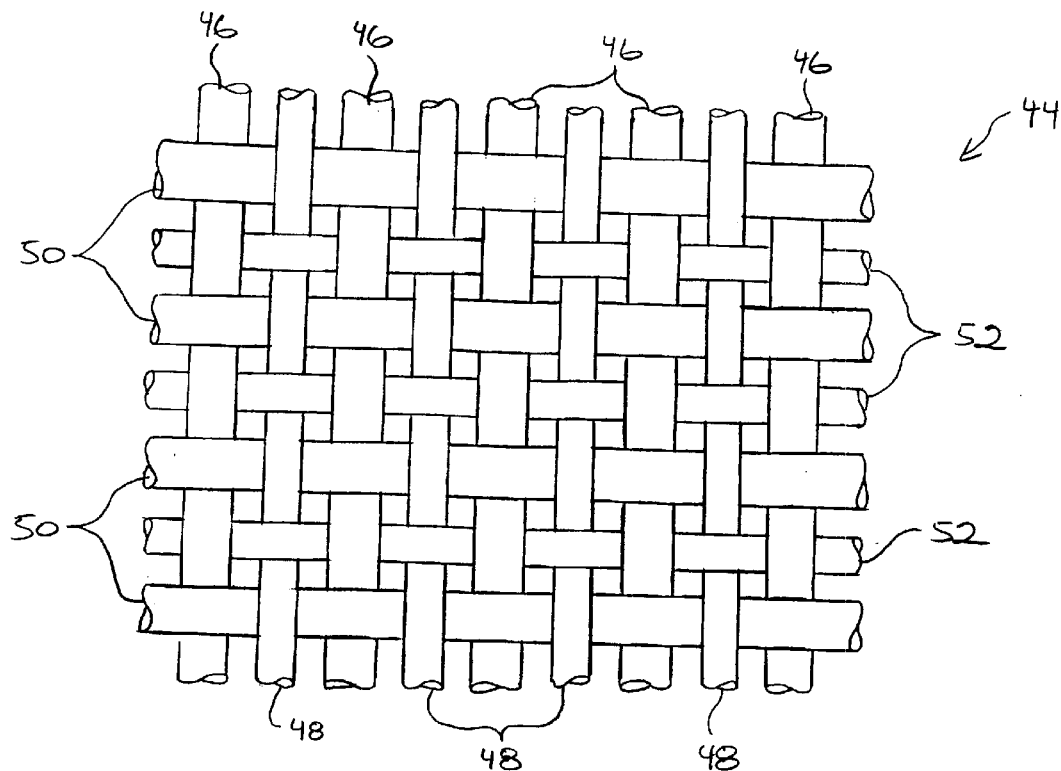
FIG. 5 is an enlarged plan view of a first alternative base fabric having alternating yarns in both warp and fill directions.

FIG. 5 shows a base fabric 44 having yarns of different sizes in both weave directions. Specifically, first warp yarns 46 and second warp yarns 48 are alternated in the warp direction of the fabric. First fill yarns 50 are similarly alternated with second fill yarns 52 in the fill direction of the fabric. It will be appreciated that first warp yarns 46 and first fill yarns 50 may be of a first yarn size (e.g., 420d), with second warp yarns 48 and second fill yarns 52 being of a second yarn size (e.g., is 315d).

The following Examples represent several constructions for the base fabric of the present invention in comparison with prior art fabrics they are intended to replace:

EXAMPLE 1

|  | Prior art | Fabric 34 | Fabric 44 |
| --- | --- | --- | --- |
| Warp Yarn | 420d | 420d | 420d/315d |
| Fill Yarn | 420d | 420d/315d | 420d/315d |
| Ends/inch | 46 | 46 | 50–54 |
| Picks/inch | 46 | 50–54 | 50–54 |

EXAMPLE 2

|  | Prior Art | Fabric 34 | Fabric 44 |
| --- | --- | --- | --- |
| Warp Yarn | 315d | 315d | 315d/210d |
| Fill Yarn | 315d | 315d/210d | 315d/210d |
| Ends/inch | 59 | 59 | 62–66 |
| Picks/inch | 59 | 62–66 | 62–66 |

As demonstrated in the above Examples, the use of a smaller yarn in alternating yarn positions yields a higher thread count than that of the "comparable" fabric of the prior art.

Figure 6:
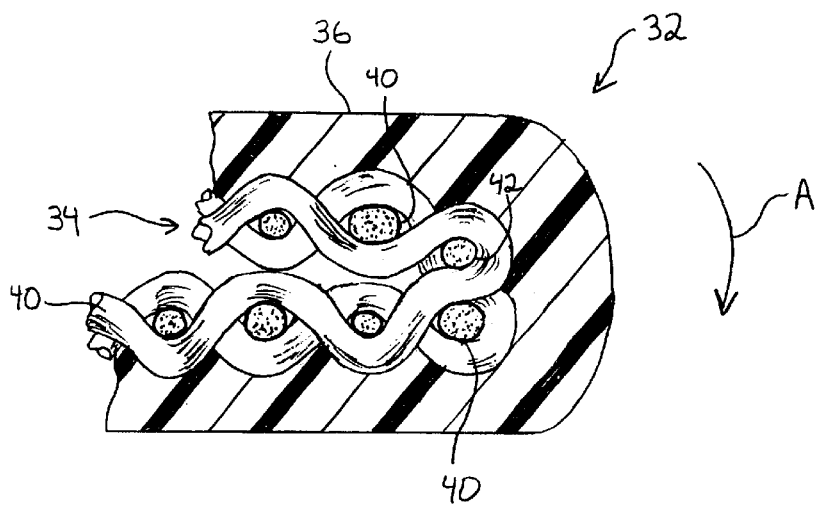
FIG. 6 illustrates the manner in which the coated fabric shown in FIG. 3A may be easily folded due to the construction of the base fabric.

A further benefit of a base fabric having alternating yarns is evident when the coated fabric 32 is folded for packaging purposes. This is illustrated in FIG. 6, where coated fabric 32 is being folded back on itself (as indicated by arrow A). Generally speaking, coated fabric 32 will tend to fold around yarns 42 (i.e., the smaller diameter yarns) instead of yarns 40. As a result, the base fabric, and the resulting coated fabric, will often require a lower bending force than a "comparable" fabric made from a single yarn size. For example, a 49×49 420d construction of the prior art may exhibit a circular bend force measurement of 1.8 pounds. A comparable material of the present invention produced with mixed yarns may exhibit a bending force of only about 1.3 pounds.

Figure 7:
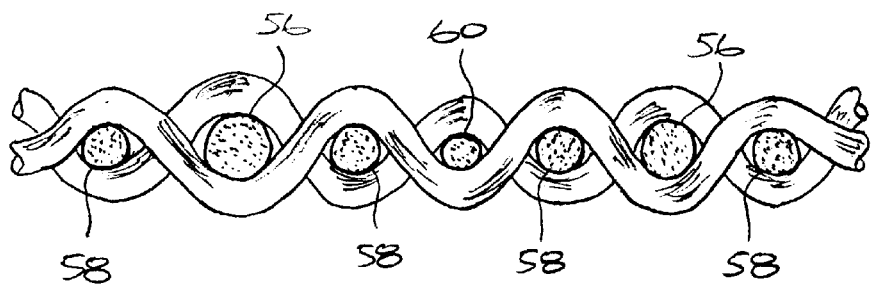
FIG. 7 is an enlarged cross-sectional side view of a second alternative base fabric constructed in accordance with the present invention.

A base fabric 54 constructed in accordance with a still further embodiment of the present invention is illustrated in FIG. 7. In this case, first fill yarns 56 are located at every fifth pick position in the fill direction of the weave. Second fill yarns 58 are located on both sides of each first fill yarn 56, as shown. The intermediate position between second fill yarns 58 is occupied by a third fill yarn 60.

It can thus be seen that the base fabric 54 has a repeated arrangement of first yarn-second yarn-third yarn-second yarn-first yarn. In one exemplary case, the first, second and third yarns may be 420d yarns, 315d yarns and 210d yarns, respectively. The warp yarns may or may not have a similar arrangement, depending on the requirements of a particular application.

In some cases, surface adhesion may be further improved by changing the weave pattern of the base fabric. For example, the base fabric may be woven into a twill weave, oxford weave or basket weave in a suitable combination of yarns and denier sizes. Toward this end, FIG. 8 illustrates a base fabric 62 produced from warp and fill yarns interwoven in a twill weave pattern.

Figure 8:
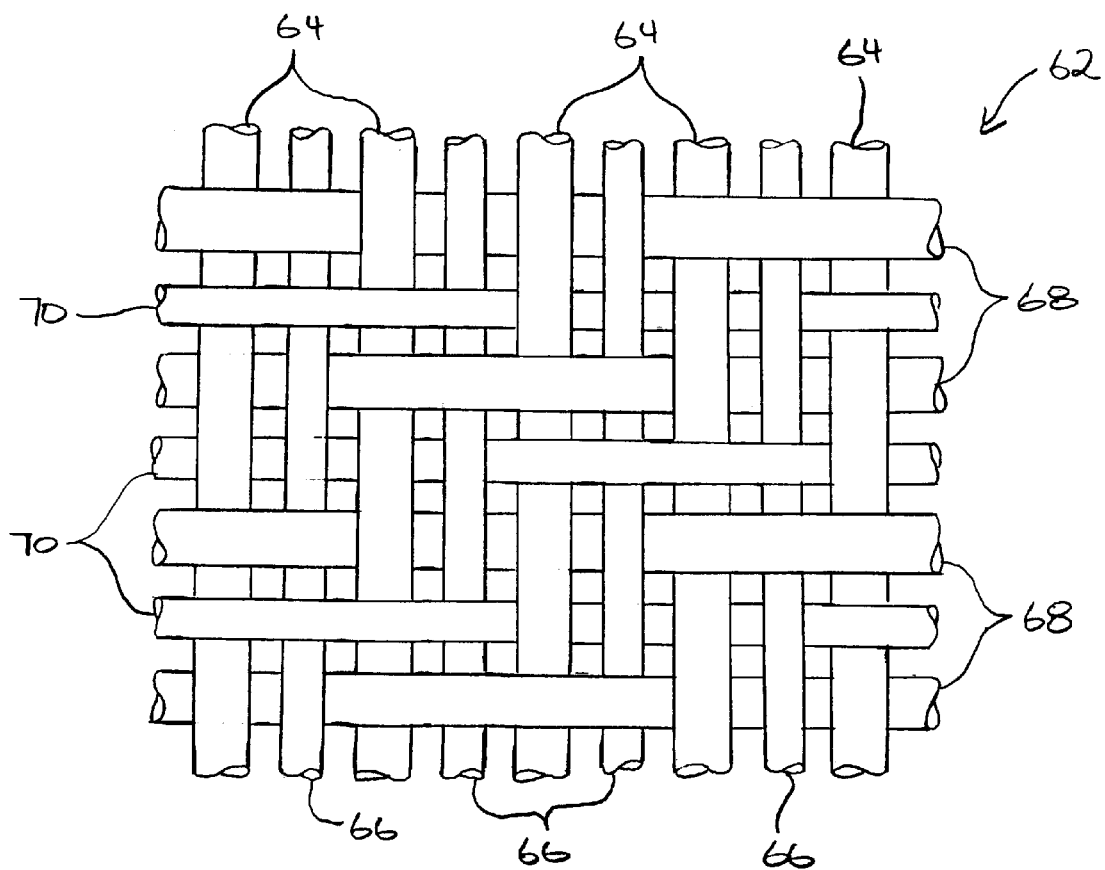
FIG. 8 is an enlarged plan view of a third alternative base fabric constructed in accordance with the present invention.

In the embodiment shown in FIG. 8, yarns of different sizes are provided in both warp and fill directions. Specifically, first warp yarns 64 are alternated with second warp yarns 66 in the warp direction of the fabric. First fill yarns 68 are similarly alternated with second fill yarns 70 in the fabric's fill direction. As an example, first warp yarns 64 and first fill yarns 68 may be 420d yarns, with second warp yarns 66 and second fill yarns 70 being 315d yarns.

In some cases, it may be possible to achieve adequate adhesion using a fancy weave without the use of multiple yarn sizes. In addition, it will often be desirable with fancy weaves to utilize a low denier per filament (LDPF) yarn, such as a yarn having filaments of six denier or less. In one exemplary embodiment, a twill weave fabric may be produced from 420d yarn having a thread count of about 49×49. Preferably, the yarns used in such a fabric will be of the type having at least 136 filaments per yarn bundle.

Although the above discussion has primarily dealt with urethane-coated fabrics, principles of the present invention also apply to other types of fabrics. For example, uncoated air bag fabrics of low permeability (1–5 CFM) may be manufactured having differently-sized yarns in alternating yarn positions. Such a fabric may be used in lieu of "comparable" uncoated fabrics of the prior art.

As an illustration, consider a prior art uncoated fabric made entirely from 210 denier yarn. In order to achieve requisite levels of strength and low permeability, this fabric has been woven to a thread count of about 72 by 72 in warp and fill directions. According to the present invention, a "comparable" fabric may be made using alternating 210 denier and 315 denier yarns in both warp and fill directions. Because the larger 315 denier yarns are used at every other yarn position, it should be possible to achieve similar tensile and tear strength at a lower thread count of about 68 by 68. It is also believed that this fabric would package more easily than the fabric made entirely from 210 denier yarn, due to the lower thread count and the facilitated bending provided by the use of alternating yarns.

Figure 9:
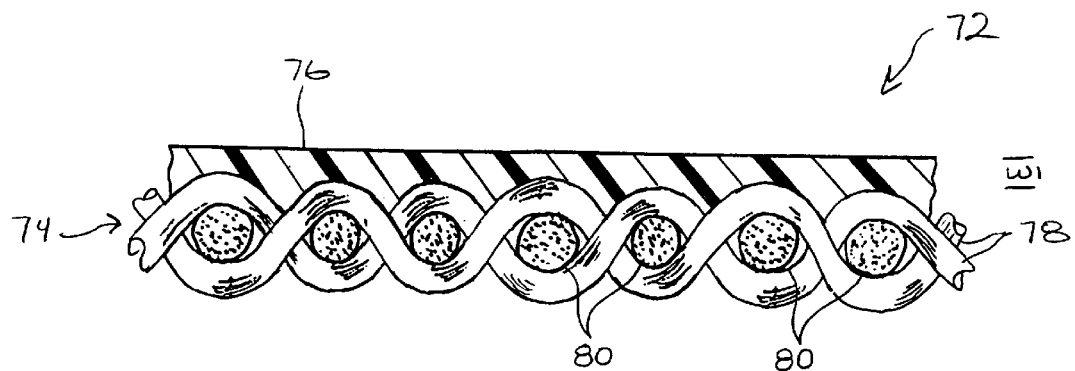
FIG. 9 is an enlarged cross-sectional view of a prior art silicone-coated fabric.

Principles of the present invention are also useful in the manufacture of fabrics coated with elastomeric compounds other than urethane, such as silicone. Toward this end, FIG. 9 illustrates a silicone-coated fabric 72 of the prior art. As shown, fabric 72 has a woven base fabric 74 coated with a layer 76 of silicone. Base fabric 74 is made in the traditional fashion from warp yarns 78 and fill yarns 80, all of which have the same yarn size. In order to render the composite structure practically impermeable to the passage of air, layer 76 has a thickness W1.

Figure 10:
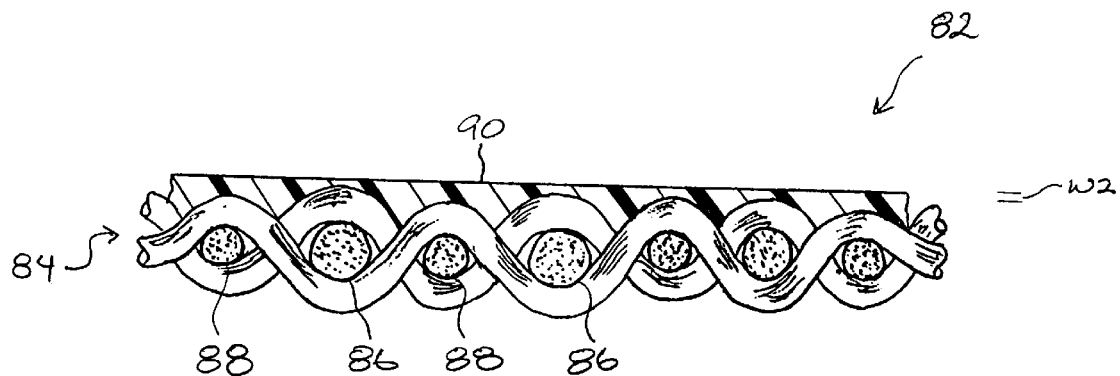
FIG. 10 is an enlarged cross-sectional side view of a silicone-coated fabric constructed in accordance with the present invention.

FIG. 10 illustrates a silicone-coated fabric constructed in accordance with the present invention. As shown, fabric 82 has a base fabric 84 woven from warp and fill yarns. In this case, first size yarns 86 are alternated with second size yarns 88 in the fill direction of the weave. The crest and trough pattern thus produced on the fabric's surface allows the silicone to more readily penetrate. As a result, the coating 90 may have a thickness W2 less than the thickness W1 of the conventional fabric while achieving similar levels of air impermeability.

It can thus be seen that the invention provides an improved coated fabric for use in a side curtain or other vehicle air bag. Embodiments have been shown in which yarns of different sizes are singularly alternated. It may be desirable in some applications, however, to mix the yarns of different sizes in another manner. For example, the base fabric could be constructed with yarns arranged in alternating pairs. In this case, a pair of first size yarns would be located between two pairs of yarns of a second size, and so forth.

Furthermore, it should be appreciated that a smaller size yarn alternated with a larger yarn need not be the next lower yarn size. For example, if it is desired to alternate a smaller yarn with a 420 denier yarn, it is not necessary to use a 315 denier yarn (i.e., the next lower yarn size) for this purpose. There may be applications where a 210 denier yarn would be most desired.

Thus, while presently preferred embodiments of the invention and presently preferred methods of practicing the same have been shown and described, it should be understood that various modifications and variations may be made thereto by those of ordinary skill in the art. In addition, it should be understood that aspects of the various embodiments may be interchanged both in whole or in part. Furthermore, those of ordinary skill in the art will appreciate that the foregoing description is by way of example only and it is not intended to be limitative of the spirit and scope of the invention so further set forth in the following claims.

What is claimed is:

1. A vehicle air bag for use with an on-board inflator mechanism, said vehicle air bag having at least one panel of coated air bag fabric, said fabric comprising:

a base fabric woven from synthetic multifilament yarns having a size of no greater than 650 denier, said yarns being arranged in warp and fill directions;

in at least one of said directions, said yarns comprising first yarns of a first yarn size and second yarns of a second yarn size, said second yarn size being a lesser yarn size than said first yarn size;

said first yarns and said second yarns being arranged in a predetermined yarn position in said fill direction of said base fabric to produce a crest and trough pattern on a surface thereof;

further comprising third yarns of a third yarn size located at predetermined positions in said fill direction of said base fabric, said third yarn size being a lesser yarn size than said second yarn size;

said base fabric being coated with an elastomeric coating material; and said base fabric is woven to have a repeated arrangement of first yarn-second yarn-third yarn-second yarn-first yarn pattern.

2. A vehicle air bag as set forth in claim 1, wherein said first yarn size is 420 denier, said second yarn size is 315 denier and said third yarn size is 210 denier.

3. A coated fabric for use in a vehicle air bag, said coated fabric comprising:

a base fabric woven from synthetic multifilament yarns having a size no greater than 650 denier, said yarns being arranged in warp and fill directions;

in at least one of said directions, said yarns comprising first yarns of a first yarn size and second yarns of a second yarn size, said second yarn being a lesser yarn size that the first yarn size;

said first yarns and said second yarns being arranged in a predetermined positions in said base fabric to produce a crest and trough pattern on a surface thereof;

further comprising third yarns of a third yarn size located at a predetermined yarn position, said third yarn size being a lesser yarn size than said second yarn size;

said base fabric being coated with an elastomeric coating material; and said base fabric is woven in the fill direction to have a repeated arrangement of first yarn-second yarn-third yarn-second yarn-first yarn.

4. A coated fabric as set forth in claim 3, wherein said first yarn size is 420 denier, said second yarn size is 315 denier and said third yarn size is 210 denier.

* * * * *